(12) United States Patent
Zhang

(10) Patent No.: US 11,488,346 B2
(45) Date of Patent: Nov. 1, 2022

(54) PICTURE RENDERING METHOD AND APPARATUS, STORAGE MEDIUM, AND ELECTRONIC APPARATUS

(71) Applicant: TENCENT TECHNOLOGY (SHENZHEN) COMPANY LIMITED, Guangdong (CN)

(72) Inventor: Huai Tao Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/170,993

(22) Filed: Feb. 9, 2021

(65) Prior Publication Data

US 2021/0166467 A1 Jun. 3, 2021

Related U.S. Application Data

(63) Continuation of application No. PCT/CN2019/115610, filed on Nov. 5, 2019.

(30) Foreign Application Priority Data

Nov. 15, 2018 (CN) .......................... 201811371864.9

(51) Int. Cl.
  *G06T 15/20* (2011.01)
  *G06T 7/536* (2017.01)
  *G06T 15/40* (2011.01)
(52) U.S. Cl.
  CPC .............. *G06T 15/20* (2013.01); *G06T 7/536* (2017.01); *G06T 15/40* (2013.01)
(58) Field of Classification Search
  None
  See application file for complete search history.

(56) References Cited

U.S. PATENT DOCUMENTS

| 2002/0075274 A1* | 6/2002 | Walton ..................... G06T 9/001 |
| | | 345/582 |
| 2004/0222988 A1 | 11/2004 | Donnelly | |
| 2012/0262447 A1* | 10/2012 | Takizawa ................ G06T 19/00 |
| | | 345/419 |

FOREIGN PATENT DOCUMENTS

| CN | 103384343 A | 11/2013 |
| CN | 104268922 A | 1/2015 |

(Continued)

OTHER PUBLICATIONS

International Search Report of PCT/CN2019/115610 dated Feb. 5, 2020.

(Continued)

*Primary Examiner* — Frank S Chen
(74) *Attorney, Agent, or Firm* — Sughrue Mion, PLLC

(57) ABSTRACT

A picture rendering method, a storage medium, and an electronic apparatus are provided. The method includes: obtaining one or more target images for a two-dimensional (2D) virtual scene, each of the one or more target images including a background, a character object moving in the background image, and a target object located at a fixed position in the background; determining a first depth value of a first pixel on the target object in the background by using a depth offset indicated in a depth map corresponding to the target object, the depth map recording a depth offset of each first pixel on the target object; obtaining a second depth value of a second pixel on the character object moving to a target display position; and rendering the one or more target images according to the first depth value and the second depth value.

20 Claims, 6 Drawing Sheets

(56) References Cited

FOREIGN PATENT DOCUMENTS

| | | |
|---|---|---|
| CN | 105513112 A | 4/2016 |
| CN | 109461199 A | 3/2019 |
| EP | 2 235 685 A1 | 10/2010 |
| WO | 2009/083885 A1 | 7/2009 |

OTHER PUBLICATIONS

Written Opinion dated Feb. 5, 2020 from the International Searching Authority in International Application No. PCT/CN2019/115610.
Extended European Search Report dated Feb. 10, 2022 from the European Patent Office in EP Application No. 19883796.5.

* cited by examiner

PICTURE RENDERING METHOD AND APPARATUS, STORAGE MEDIUM, AND ELECTRONIC APPARATUS

CROSS-REFERENCE TO RELATED APPLICATION(S)

This application is a continuation of PCT/CN2019/115610 and claims priority to Chinese Patent Application No. 201811371864.9, entitled "PICTURE RENDERING METHOD AND APPARATUS, STORAGE MEDIUM, AND ELECTRONIC APPARATUS" and filed with the National Intellectual Property Administration, PRC on Nov. 15, 2018, the disclosures of which are incorporated by reference herein in their entireties.

FIELD

Embodiments of the disclosure relate to the field of computer vision (CV) technology, and specifically, to a picture rendering technology.

BACKGROUND

A two-dimensional (2D) virtual scene often carries only 2D picture information of the 2D virtual scene. In a conventional rendering manner of rendering virtual objects included in a picture, there is blockage between the virtual objects during the rendering of the virtual objects, and translucence processing is performed on the blocked virtual objects to simulate a blocking relationship between the virtual objects in the 2D virtual scene.

SUMMARY

Embodiments of the disclosure provide a picture rendering method and apparatus, a storage medium, and an electronic apparatus, to resolve at least a technical problem of relatively low accuracy of rendering 2D picture information.

According to an embodiment, there is provided a picture rendering method, performed by an image processing device. The method includes: obtaining one or more target images for a two-dimensional (2D) virtual scene, each of the one or more target images including a background, a character object moving in the background, and a target object located at a fixed position in the background; determining a first depth value of a first pixel among a plurality of first pixels on the target object in the background by using a depth offset indicated in a depth map corresponding to the target object, the depth map recording a depth offset of each first pixel of the plurality of first pixels on the target object; obtaining a second depth value of a second pixel among a plurality of second pixels on the character object moving to a target display position; and rendering the one or more target images according to the first depth value and the second depth value.

According to an embodiment, there is provided a picture rendering apparatus, including: at least one memory configured to store computer program code; and at least one processor configured to access the memory and operate as instructed by the computer program code. The computer program code includes: first determination code configured to cause the at least one processor to obtain one or more target images for a 2D virtual scene, each of the one or more target images including a background, a character object moving in the background, and a target object located at a fixed position in the background; second determination code configured to cause the at least one processor to determine a first depth value of a first pixel among a plurality of first pixels on the target object in the background by using a depth offset indicated in a depth map corresponding to the target object, the depth map recording a depth offset of each first pixel of the plurality of first pixels on the target object; obtaining code configured to cause the at least one processor to obtain a second depth value of a second pixel among a plurality second pixels on the character object moving to a target display position; and rendering code configured to cause the at least one processor to render the one or more target images according to the first depth value and the second depth value.

According to an embodiment, there is provided a non-transitory computer-readable storage medium, storing at least one computer program code, the at least one computer program code, when executed by a processor, causes the processor to: obtain one or more target images for a two-dimensional (2D) virtual scene, each of the one or more target images including a background, a character object moving in the background, and a target object located at a fixed position in the background; determine a first depth value of a first pixel among a plurality of first pixels on the target object in the background by using a depth offset indicated in a depth map corresponding to the target object, the depth map recording a depth offset of each first pixel of the plurality of first pixels on the target object; obtain a second depth value of a second pixel among a plurality of second pixels on the character object moving to a target display position; and render the one or more target images according to the first depth value and the second depth value.

According to an embodiment, there is provided a picture rendering method, performed by an image processing device. The method includes: obtaining a target image for a two-dimensional (2D) virtual scene, the target image including a background image, a character object moving in the background image, and a target object located at a fixed position in the background image; determining a first depth value of a first pixel among a plurality of first pixels on the target object in the background image by using a depth offset indicated in a depth map corresponding to the target object, the depth map recording a depth offset of each first pixel of the plurality of first pixels on the target object; obtaining a second depth value of a second pixel among a plurality of second pixels on the character object moving to a target display position; and rendering the target image according to the first depth value and the second depth value. Counterpart apparatus and non-transitory computer-readable storage medium embodiments are also contemplated.

BRIEF DESCRIPTION OF THE DRAWINGS

The above and other aspects, features and advantages of embodiments of the disclosure will become more apparent from the following description taken in conjunction with the accompanying drawings, in which.

DESCRIPTION

To make a person skilled in the art better understand embodiments of the disclosure, the following descriptions are made with reference to the accompanying drawings. Apparently, the embodiments described herein are only some rather than all of the embodiments. All other embodiments obtained by a person of ordinary skill in the art based on the embodiments of the disclosure without creative efforts shall fall within the protection scope of the disclosure.

The terms such as "first" and "second" used in the disclosure are intended to distinguish between similar objects, but are not necessarily used for describing a specific sequence or a chronological order. It is to be understood that such terms may be used interchangeably in proper circumstances, so that the embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

According to an aspect of the embodiments, a picture rendering method is provided. The picture rendering method is applicable to an image processing device, for example, a terminal device or a server. The method may be performed by the terminal device. The terminal device, for example, may be a device such as a smart terminal, a computer, a personal digital assistant (PDA), a tablet computer or the like. The method may be performed by the server. The server may be an independent server or may be a plurality of servers in a cluster.

Figure 1:
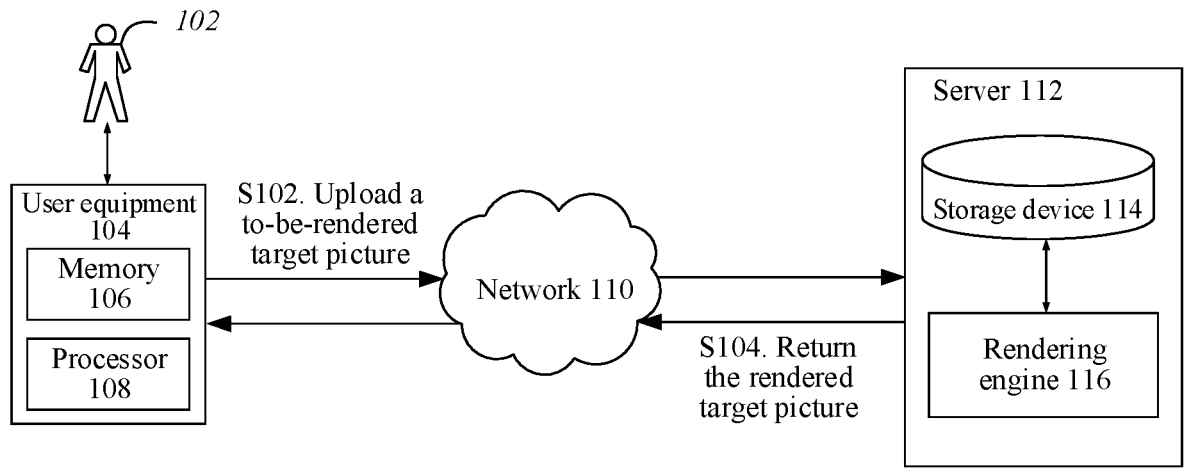
FIG. 1 is a schematic diagram of an environment of a picture rendering method according to an embodiment.

In an embodiment, the picture rendering method is applicable to, but not limited to, an environment shown in FIG. 1. As shown in FIG. 1, a user 102 may access data using a user equipment 104. The user equipment 104 includes a memory 106 and a processor 108. The memory 106 is configured to store one or more target pictures or target images, and the processor 108 is configured to process data. The user equipment 104 uploads the target picture to a server 112 in step S102 through a network 110. The server 112 includes a storage device 114 and a rendering engine 116. The storage device 114 is configured to store the target picture and a rendered target picture, and the rendering engine 116 is configured to render the target picture into the rendered target picture. After obtaining the rendered target picture, the server 112 returns the rendered target picture to the user equipment 104 in step S104 through the network 110. The user equipment 104 displays the rendered target picture.

It is to be noted that, in the related art, during the rendering of 2D picture information, a conventional method is as follows:

Method 1: Whole Scene

In the related art, the ground and items are not separated, and are drawn in one picture. When a character is blocked by an item in a scene, translucence processing is performed on the character to show blockage. Here, fewer resources are consumed, therefore, this method is more commonly used in early 2D games. However, the conventional method has low performance because the translucence processing is performed on the character, and the rendering of the character is blurred, therefore, the rendering accuracy is low.

Method 2: Separate Ground and Scene Items

In the related art, the ground and the scene items are independent pictures, and all the items are sorted in real time, and are drawn in order from the farthest item to the closest item (i.e., the painter's algorithm). According to this conventional method, there is an advantage in that it has better performance than earlier solutions. However, the consumption of resources is too high due to a resource amount of an installation package requiring a large space in a memory, and the time required to process rendering increases as the number of rendering times for drawing increases load on a processor.

As described above, there are problems of severe distortion or high consumption of resources in the related art during the rendering of 2D pictures.

According to various embodiments of the disclosure, after the background (or background image) is obtained, it may be determined according to the first depth value of the target object in the background and the second depth value of the pixel on the character object whether to render the pixel on the character object, so that the character object can be distinct from the target object in the background, and there is an obvious blocking relationship. Even if there is a blockage between the target object in the background and the character object outside the background, it can still be ensured that the background and the character object are accurately rendered, thereby improving the rendering accuracy. In addition, because the background and the character object are rendered at once, consumption is reduced, and certain resources can be reserved for other operations.

The picture rendering method performed by the server is merely an example. The picture rendering method is further applicable to, but not limited to, a terminal that is capable of data computation or the like. The network may include, but not limited to, a wireless network or a wired network. The wireless network includes: Wi-Fi, Bluetooth, and other networks implementing wireless communication. The wired network may include, but not limited to: a wide area network, a metropolitan area network, a local area network, and the like. The server may include, but not limited to, a cloud server or any hardware device that is capable of performing computation.

In an embodiment, for example, the terminal device may be used as an image processing device to perform the picture rendering method provided in the embodiments of the disclosure.

Figure 2:
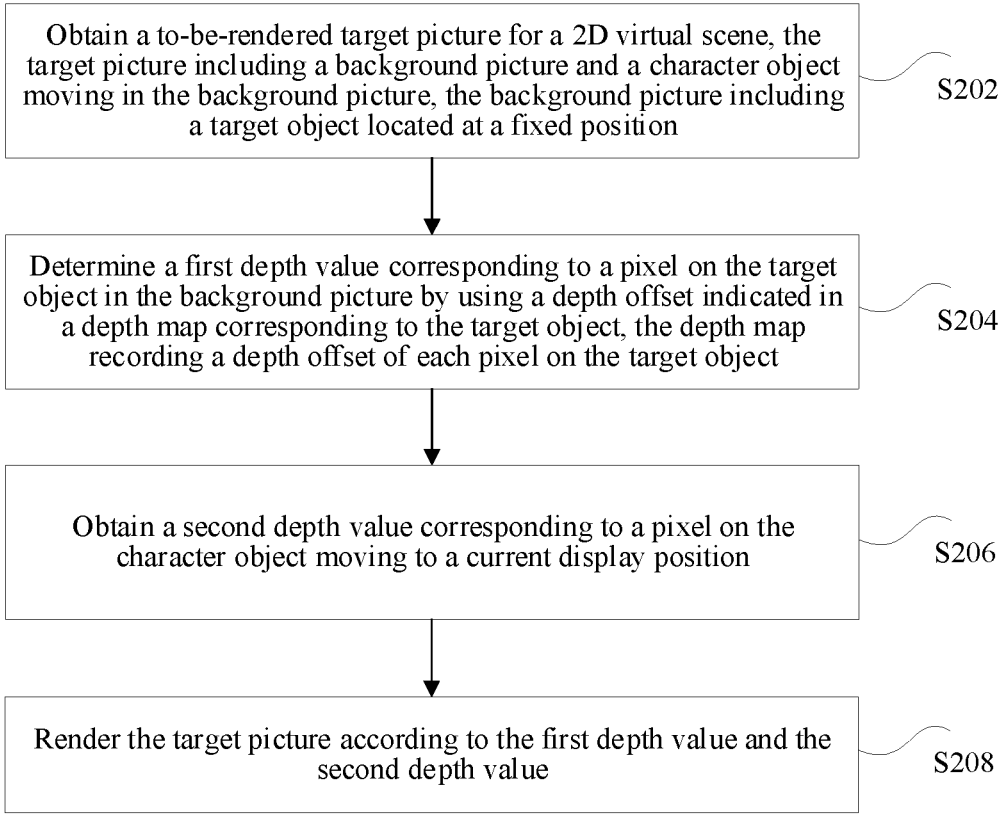
FIG. 2 is a flowchart of a picture rendering method according to an embodiment.

FIG. 2 is a flowchart of a picture rendering method according to an embodiment. As shown in FIG. 2, the picture rendering method includes the following steps:

In step S202, the terminal device obtains one or more target pictures (or one or more target images) for a 2D virtual scene.

The target picture includes a background (or background image) and a character object moving in the background, and the background includes a target object located at a fixed position.

In step S204, the terminal device determines a first depth value corresponding to at least one pixel representing the target object in the background by using a depth offset indicated in a depth map corresponding to the target object.

The depth map records a depth offset of each pixel of the target object.

In step S206, the terminal device obtains a second depth value corresponding to at least one pixel on the character object moving from one position to another display position.

In step S208, the terminal device renders the target picture according to the first depth value and the second depth value.

The picture rendering method is applicable to, but not limited to, a process of rendering a game picture of a 2D plane game, or a process of rendering a picture of a 2D animation.

For the ease of description, one or more embodiments are described below as the picture rendering method is applied to the process of rendering the game picture of the 2D plane game. After the game picture of the 2D plane game is obtained, the obtained game picture is used as the target picture. The target picture includes a background and a character object moving in the background. The background includes a target object located at a fixed position. A first depth value corresponding to a pixel on the target object in the background and a second depth value of a pixel on a character object are obtained, and the target picture is rendered according to the first depth value and the second depth value.

In the foregoing process, after obtaining the background, the terminal device may determine, according to the first depth value of the target object in the background and the second depth value of the pixel on the character object, whether to render the pixel on the character object. If the pixel on the character object is rendered, the character object can be set to be distinct from the background in the target picture, thereby ensuring that the background and the character object can still be accurately rendered when there is blockage between the target object in the background and the character object outside the background, and improving the rendering accuracy.

In an embodiment, a manner in which the terminal device determines the target object and the character object in the target picture may include determining a moving object in at least two consecutive frames as a character object, and determine a non-moving object (or stationary object) in consecutive frames as a target object. For example, when two consecutive frames of 2D animation is obtained, the position or the shape of an object in the picture changes. For example, if a character moves, the object whose position or shape changes is determined as the character object. If neither of the position and the shape of the object in the picture changes, for example, neither of the position and the shape of a building changes in consecutive frames, the object whose position and shape remain unchanged is determined as the target object. Although the above example illustrates determining the position and/or shape change using two consecutive frames, it is understood that in some embodiments a single frame or other number of consecutive frames may also be used (e.g., one or more frames). In an embodiment, a target image or picture may refer to as a frame or a frame in a plurality of consecutive frames of 2D animation. Two consecutive frames (or one or more consecutive frames) of 2D animation may refer to as two consecutive target images or pictures (or one or more consecutive target images or pictures) of 2D animation.

Figure 3:
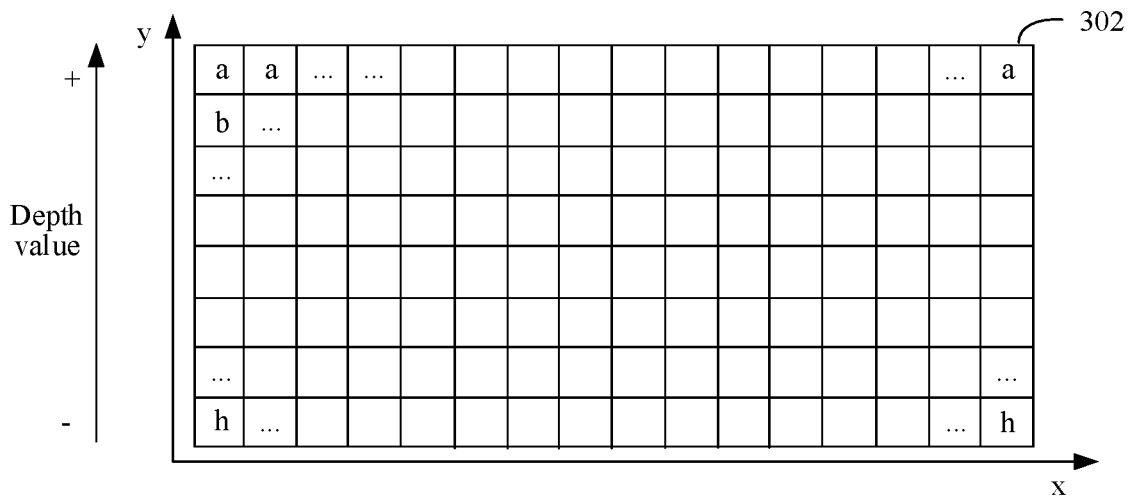
FIG. 3 is a schematic diagram of a picture rendering method according to an embodiment.

The terminal device may determine a depth value for each pixel in the target picture. A depth value is used for representing a distance of a picture presented by each pixel. FIG. 3 is a schematic diagram of a picture rendering method according to an embodiment. A target picture 302 is shown in FIG. 3. If a rectangular coordinate system is used to represent a display screen of a terminal, each pixel in the target picture 302 corresponds to a pair of coordinates. A depth value of each pixel may be obtained according to the ordinate of the coordinate values of the each pixel. In FIG. 3, in the horizontal direction x, depth values of each row of pixels are the same, and in the vertical direction from top to bottom, depth values of each row of pixels are a, b, . . . , and h, respectively. A higher pixel in the vertical direction indicates a larger depth value, and indicates that an object in an image depicted by a pixel is relatively farther away than another object in the image, and a smaller depth value indicates that an object in an image depicted by the pixel is relatively closer than another object in the image.

During the rendering, if the depth value of the pixel becomes smaller, the presented picture covers a previous picture. If the depth value of the pixel becomes larger, the presented picture does not change.

In addition, after determining a depth value of each pixel in the background and before determining the first depth value of the pixel of the target object in the background, the terminal device may obtain the depth map by using the following method: determining a ground line between the target object in the background and the ground presented in the 2D virtual scene; determining the depth offset of the pixel on the target object according to a projection distance between a pixel on the target object and the ground line; and generating the depth map by using the depth offset.

The depth offset may be, but not limited to, a connection line between the target object and the ground in the background. That is, the depth offset may be a difference between depth values of the pixel on the target object and the pixel projected onto the ground line.

An example in which a pixel 1 and a pixel 2 exist in the target object included in the background will be used. The pixel 2 is a pixel on a non-ground line, and the pixel 1 is a pixel projected onto the ground line by the pixel 2. For example, a depth value of the pixel 1 is 100, and a depth value of the pixel 2 is 150. In this case, a projection distance between the pixel 1 and the pixel 2 is 50, and it is determined that the depth offset of the pixel 2 is 50. In this case, a depth map is generated according to a depth offset of each point in the target object.

Moreover, after generating the depth map, the terminal device may calculate the first depth value of the target object according to the depth map.

Figure 4:
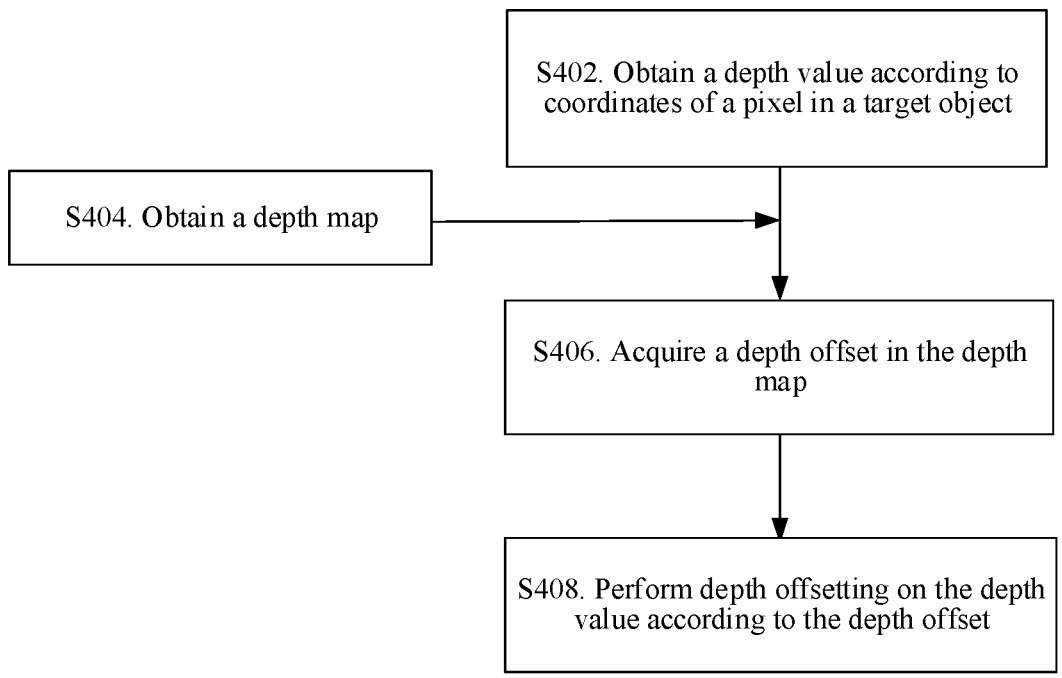
FIG. 4 is a flowchart of a picture rendering method according to an embodiment.

FIG. 4 is a flowchart of a picture rendering method according to an embodiment. As shown in FIG. 4, after obtaining the depth value of the pixel according to the coordinate values of the pixel in the target object through S402, the terminal device obtains the depth map in S404. Because the depth map stores the depth offset, the depth offset in the depth map may be acquired or extracted from the depth map in S406. When the depth value and the depth offset of the pixel are obtained, offsetting may be performed on the depth value according to the depth offset in S408, to obtain the first depth value of the pixel in the target object.

The terminal device may obtain the second depth value of the pixel on the character object by using the following method: obtaining, by the terminal device, a depth value corresponding to a feature pixel at a target position associated with the character object; and using the depth value corresponding to the feature pixel as the second depth value of each pixel on the character object.

Here, the feature pixel may be selected one pixel from pixels covered by the character object as the feature pixel. For example, a lowest pixel of the character object is obtained as the feature pixel, and a depth value of the lowest pixel is assigned to the each pixel in the character object, so that all pixels in the character object have the same depth value. In this case, the depth value of the each pixel is the second depth value.

The terminal device may obtain the first depth value of the target object and the second depth value of the character object, and may perform rendering using the following method: rendering the background, the pixel on the target object in the background being rendered according to the first depth value; and determining pixels occupied by the character object in the background, and obtaining a first pixel (the first pixel being any pixel occupied by the character object in the background) from the pixels occupied by the character object in the background to perform the following operations: rendering the first pixel on the character object according to the second depth value, based on determining that the first pixel is not a pixel on the target object; comparing the first depth value and the second depth value on the first pixel, based on determining that the first pixel is a pixel on the target object, to obtain a comparison result, the comparison result being used for indicating a blocking relationship between the target object and the character object; and rendering the character object according to the comparison result.

Here, there may be a blocking relationship between the target object and the character object. Therefore, during the rendering, the terminal device first renders the target object, and then renders the character object after completing the rendering of the target object. A non-overlapping part between the character object and the target object is normally rendered, and an overlapping part between the character object and the target object is determined. If the first depth value is less than the second depth value, it indicates that the target object is blocking the character object, so the rendering of the overlapping part must be skipped. If the first depth value is greater than the second depth value, it indicates that the character object is blocking the target object, so the overlapping part is normally rendered according to the method for rendering the character object.

Figure 5:
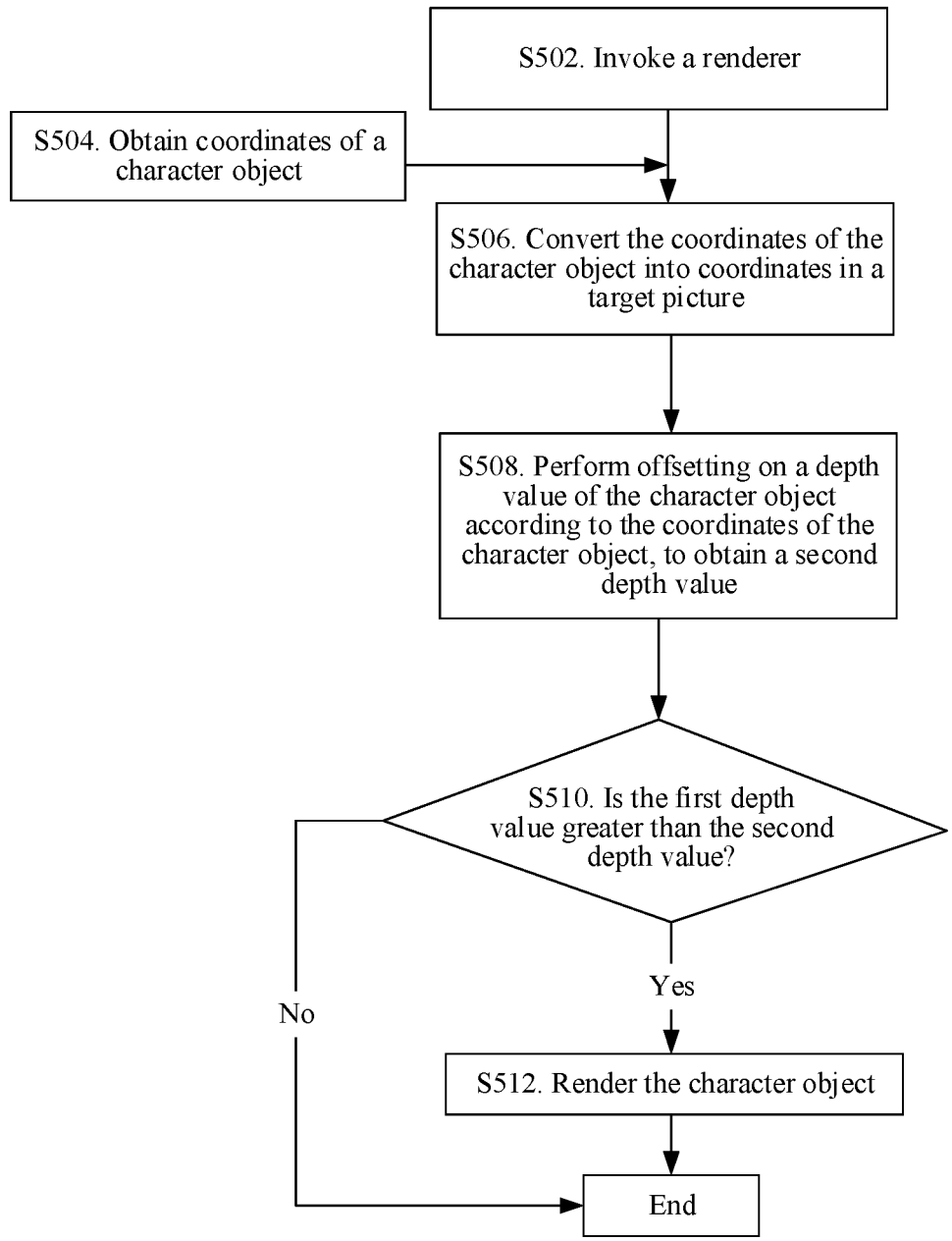
FIG. 5 is a flowchart of a picture rendering method according to another embodiment.

A process of rendering the character object is described with reference to FIG. 5. The coordinates of the position of the character object may be different from a coordinate dimension in the target picture. Therefore, the terminal device needs to convert the coordinates of the character object into coordinates in the target picture. That is, the coordinates of the character object are converted into coordinates in a 2D rectangular coordinate system according to a display screen of a terminal. After a renderer is invoked in S502 and the coordinates of the character object are obtained in S504, the coordinates of the character object are converted into the coordinates in the 2D rectangular coordinate system according to the display screen of the terminal in S506. Next, an offsetting operation may be performed on the depth value of the character object according to the coordinates of the character object in S508, to obtain the second depth value. Subsequently, the terminal device compares the first depth value with the second depth value through S510. When the first depth value is greater than the second depth value, the terminal device renders the overlapping part between the character object and the target object in S512. When the first depth value is less than or equal to the second depth value, the terminal device skips rendering the overlapping part between the character object and the target object.

According to this embodiment, the method includes: obtaining a target picture for a 2D virtual scene; determining a first depth value corresponding to a pixel on the target object in the background by using a depth offset indicated in a depth map corresponding to the target object; obtaining a second depth value corresponding to a pixel on the character object moving to a target display position; and rendering the target picture according to the first depth value and the second depth value. In the foregoing method, after a background is obtained, it may be determined according to the first depth value of the target object in the background and the second depth value of the pixel on the character object whether to render a pixel overlapping the target object on the character object. Therefore, the character object can be distinct from the target picture in the background, and there may be an obvious blocking relationship, thereby ensuring that the background and the character object can still be accurately rendered when there is blockage between the target object in the background and the character object outside the background, and improving the rendering accuracy.

In an embodiment, the terminal device rendering one or more target images or pictures according to the first depth value and the second depth value includes the following steps:

S1. Render the background (or background image), and the pixel on the target object in the background according to the first depth value.

S2. Determine pixels occupied by the character object in the background, and obtain a first pixel from among the pixels occupied by the character object in the background to perform the following operations:

S3. Render the first pixel on the character object according to the second depth value, based on determining that the current pixel is not a pixel on the target object.

S4. Compare the first depth value and the second depth value on the first pixel, based on determining that the first pixel is a pixel on the target object, to obtain a comparison result, the comparison result being used for indicating a blocking relationship between the target object and the character object.

S5. Render the character object according to the comparison result.

Figure 6:
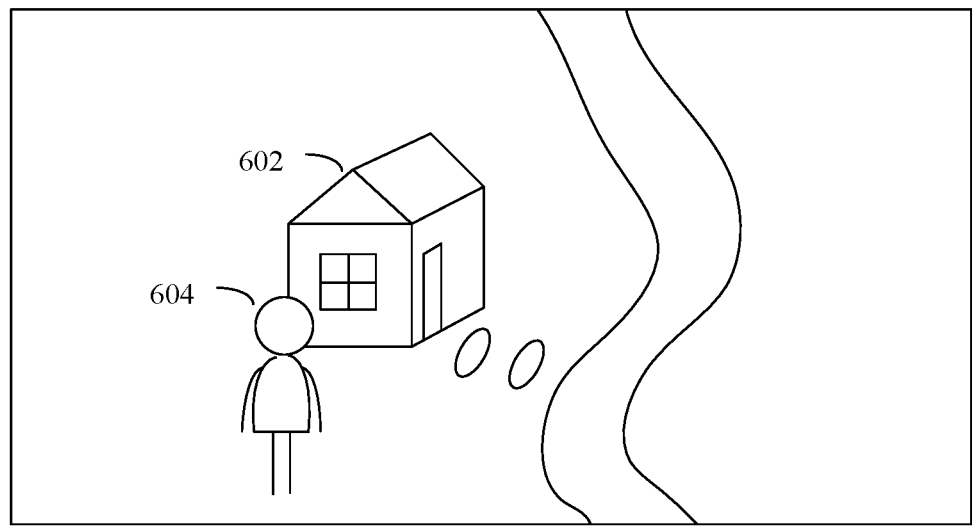
FIG. 6 is a schematic diagram of a picture rendering method according to an embodiment.

For example, description is made with reference to FIG. 6. FIG. 6 is a schematic diagram of a picture rendering method according to an embodiment. As shown in FIG. 6, a target picture includes a target object 602 and a character object 604. During the rendering, the terminal device first renders the background, and a pixel of the target object 602 in the background is rendered according to the first depth value. Next, the character object 604 is rendered according to the second depth value, and each pixel overlapping the target object 602 in the character object 604 is sequentially used as the first pixel to compare the first depth value with the second depth value. Because the second depth value is the depth value of the pixel of the character object 604, and the first depth value is the depth value of the pixel on the target object 602, after the comparison, a blocking relationship between the character object 604 and the target object

602 may be obtained. FIG. 6 shows a case in which the second depth value is less than the first depth value, and it indicates that the pixel in the character object 604 needs to be rendered. In this case, the presented picture is that the pixel of the target object is blocked by the pixel of the character object.

According to this embodiment, the character object is rendered according to the first depth value and the second depth value, so that the blocking relationship between the character object and the target object may be obtained through clear rendering, thereby improving the accuracy of rendering the target picture.

In an embodiment, the terminal device renders the character object according to the comparison result and includes the following steps:

S1. Render the first pixel according to the second depth value, based on the comparison result indicating that the first depth value is greater than the second depth value.

S2. Skip rendering the first pixel, based on the comparison result indicating that the first depth value is less than or equal to the second depth value.

It has been mentioned in FIG. 3 that, a larger ordinate value indicates a larger depth value of the pixel, and a picture presented by the corresponding pixel is farther. Therefore, when the terminal device determines that the pixel in the character object is rendered by using the first depth value and the second depth value, the character object is rendered by using the second depth value, and for a pixel in the overlapping part between the character object and the target object, the pixel is used as the first pixel to compare the first depth value and the second depth value of the first pixel. If the first depth value is less than the second depth value, the rendering of the first pixel is skipped, and it indicates that the first pixel on the character object is blocked by the target object. If the first depth value is greater than the second depth value, the first pixel is rendered, and it indicates that the first pixel on the character object is not blocked by the target object.

According to this embodiment, it is determined according to the first depth value and the second depth value whether to render the character object, thereby improving the accuracy of rendering the character object, and further improving the rendering accuracy of rendering the target picture.

In an embodiment, the terminal device may render the background (or background image) and include the following steps:

S1. Obtain depth information stored in a depth buffer corresponding to the background, the depth information corresponding to the pixel on the target object including the first depth value determined according to the depth offset, the depth information corresponding to a ground pixel used for presenting the ground in the 2D virtual scene including a third depth value corresponding to the ground pixel.

S2. Render the background according to the depth information.

In addition, description is made with reference to FIG. 3. After the terminal device obtains the target picture, the target picture includes the background, and the background includes the target object. If a rectangular coordinate system is used according to the screen of the terminal, each pixel in the target picture corresponds to coordinate values. A depth value is set for the each pixel in the target picture according to the coordinate values. The depth value includes the third depth value used for presenting the ground pixel of the ground and the first depth value that undergoes depth offsetting and is used for presenting the pixel of the target object. The third depth value and the first depth value are used as the depth information to be stored in the depth buffer. During the rendering, the ground rendered by using the third depth value in the target picture may be obtained from the depth buffer, and the target object in the target picture is rendered by using the first depth value.

According to this embodiment, the terminal device renders the pixel on the target object by obtaining the depth information in the depth buffer corresponding to the background, thereby ensuring the accuracy of rendering the target object, and further ensuring the rendering accuracy of rendering the target picture.

In an embodiment, before the terminal device renders the background according to the depth information stored in the depth buffer, the method may further include the following steps:

S1. Obtain display coordinates of each pixel in the background (or background image) on a screen, and sequentially perform the following steps on a second pixel in the background.

S2. Determine, according to the display coordinates, a depth change value of the second pixel in a depth indication direction configured for the screen, and determine the depth change value as an initial depth value of the second pixel.

S3. Store the initial depth value as the third depth value in the depth buffer based on the second pixel being the ground pixel.

S4. Update the initial depth value to the first depth value and store the first depth value in the depth buffer based on the second pixel being a pixel on the target object.

The depth change value may be, but not limited to, an ordinate value of the pixel. The ground pixel may be, but not limited to, a pixel of a picture used for showing the ground.

For example, after obtaining display coordinates of each pixel in the background according to the rectangular coordinate system erected according to the display screen of the terminal, the terminal device determines an initial depth value of the pixel according to the ordinate of the display coordinates. In this case, the each pixel in the background includes an initial depth value. The initial depth value is stored in the depth buffer as the third depth value when the pixel is used for displaying the picture of the ground. The initial depth value of the pixel is updated to the first depth value, and the first depth value is stored in the depth buffer when the pixel is a pixel in the target object.

According to this embodiment, the initial depth value or the first depth value of the pixel is determined according to the position of the pixel, to obtain the depth buffer, thereby improving the accuracy of obtaining the depth buffer, and further improving the rendering accuracy of rendering the target picture.

In an embodiment, the terminal device obtains a second depth value corresponding to a pixel on the character object moving to a target display position and includes the following steps:

S1. Obtain a depth value corresponding to a feature pixel at a target position associated with the character object.

S2. Use the depth value corresponding to the feature pixel as the second depth value of each pixel on the character object.

Figure 7:
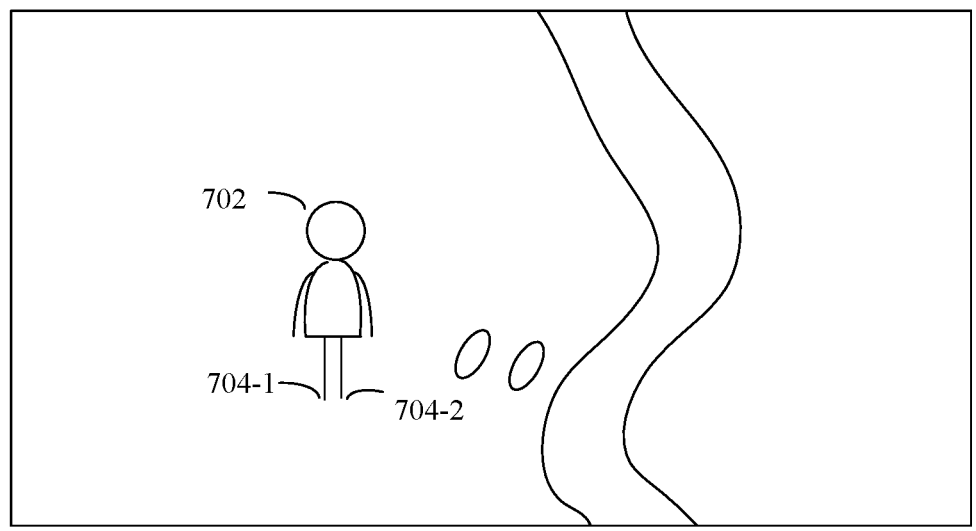
FIG. 7 is a schematic diagram of a picture rendering method according to another embodiment.

The obtaining of a depth value corresponding to a feature pixel at a target position associated with the character object may include, but not limited to, obtaining a depth value of a pixel with the smallest ordinate of the character object. For example, description is made with reference to FIG. 7. FIG. 7 is a schematic diagram of a picture rendering method according to an embodiment. FIG. 7 shows a character object 702 in the target picture. A lowest point 704-1 of the right foot and a lowest point 704-2 of the left foot of the character object are points with the smallest ordinate of the character object 702. Because the ordinates of the two points are equal, the terminal device obtains a depth value of the lowest point 704-1 of the right foot or a depth value of the lowest point 704-2 of the left foot, and uses the depth value as the second depth value of the each pixel on the character object.

According to this embodiment, the depth value of the feature pixel is used as the second depth value of the each pixel on the character object, so that it may be accurately determined according to the second depth value whether to render the pixel of the character object, thereby improving the rendering efficiency of rendering the target picture.

In an embodiment, before the terminal device determines a first depth value corresponding to a pixel on the target object in the background (or background image) by using a depth offset indicated in a depth map corresponding to the target object, the method further includes the following steps:

S1. Determine a ground line between the target object in the background and the ground presented in the 2D virtual scene.

S2. Determine the depth offset of the pixel on the target object according to a projection distance between a pixel on the target object and the ground line.

S3. Generate the depth map by using the depth offset.

Here, the depth offset may be, but not limited to, a value greater than or equal to zero.

Figure 8:
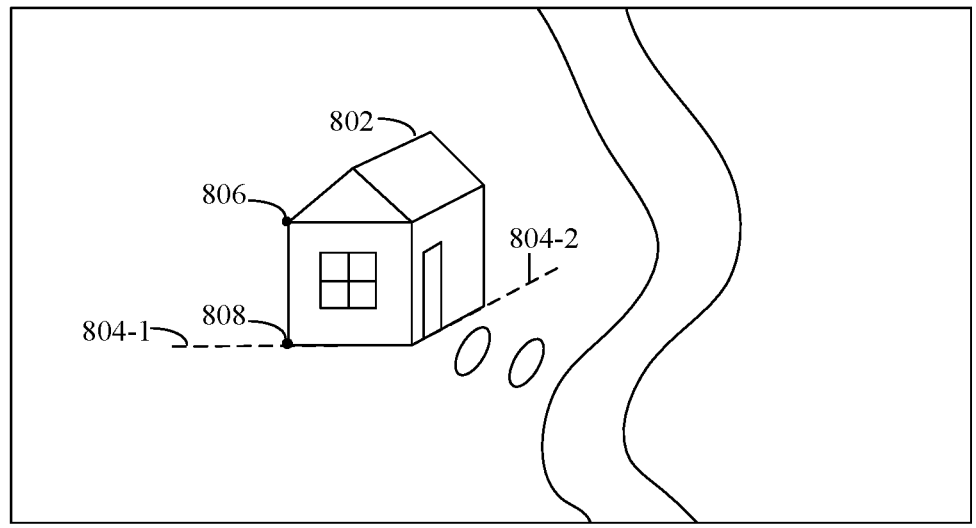
FIG. 8 is a schematic diagram of a picture rendering method according to another embodiment.

Also, the ground line may be, but not limited to, a connection line between the target object and the ground. For example, description is made with reference to FIG. 8. FIG. 8 is a schematic diagram of a picture rendering method according to an embodiment. FIG. 8 shows a target object 802, and connection lines between the target object 802 and the ground lines 804-1 and 804-2. A pixel 806 on the target object is vertically projected at the position of a pixel 808 on the ground line. In this case, a projection distance between the pixel 806 and the pixel 808 is the depth offset. The terminal device obtains the depth offset of the each pixel in the target object, to generate the depth map.

According to this embodiment, the depth offset is determined according to the projection distance between the pixel of the target object in the background and the ground line, thereby improving the efficiency and accuracy of generating the depth map, further ensuring the accuracy of obtaining the first depth value, and improving the accuracy of rendering the target picture.

It is to be noted that, for the ease of description, the foregoing method embodiments are stated as a series of action combinations. However, a person skilled in the art will understand that one or more embodiments are not limited to the described sequence of the actions, and some steps may be performed in another sequence or may be simultaneously performed. In addition, a person skilled in the art would also understand that all the embodiments described herein are exemplary embodiments, and the related actions and modules are not necessarily essential or mandatory.

Figure 9:
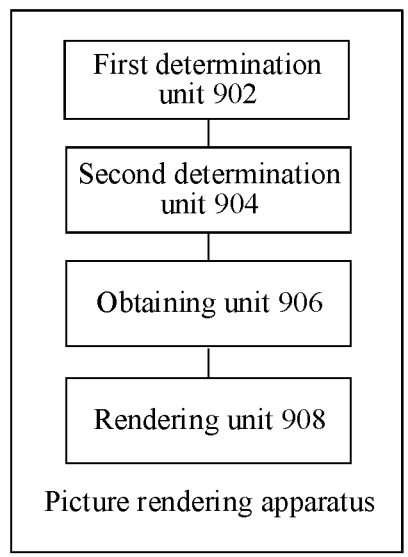
FIG. 9 is a structural diagram of a picture rendering apparatus according to an embodiment.

According to another aspect of the embodiments, a picture rendering apparatus for implementing the foregoing picture rendering method is further provided. FIG. 9 is a schematic structural diagram of a picture rendering apparatus according to an embodiment. As shown in FIG. 9, the apparatus includes:

(1) a first determination unit 902 configured to obtain one or more target images or pictures for a 2D virtual scene, each of the target images or pictures including a background (or background image) and a character object moving in the background, the background including a target object located at a fixed position;

(2) a second determination unit 904 configured to determine a first depth value corresponding to a pixel on the target object in the background by using a depth offset indicated in a depth map corresponding to the target object, the depth map recording a depth offset of each pixel on the target object;

(3) an obtaining unit 906 configured to obtain a second depth value corresponding to a pixel on the character object moving to a target display position; and (4) a rendering unit 908 configured to render the one or more target images or pictures according to the first depth value and the second depth value.

The picture rendering apparatus is applicable to, but not limited to, a process of rendering a game picture of a 2D plane game, or a process of rendering a picture of a 2D animation.

The picture rendering method will be described in more detail below based on an example of rendering the game picture of the 2D plane game. After the game picture of the 2D plane game is obtained, the obtained game picture is used as the target picture. The target picture includes a background and a character object moving in the background. The background includes a target object located at a fixed position. A first depth value corresponding to a pixel on the target object in the background and a second depth value of a pixel on a character object are obtained, and the target picture is rendered according to the first depth value and the second depth value.

In the foregoing process, after the background is obtained, it may be determined according to the first depth value of the target object in the background and the second depth value of the pixel on the character object whether to render the pixel on the character object, so that the character object can be distinguished from the background in the target picture, and there is an obvious blocking relationship, thereby ensuring that the background and the character object can still be accurately rendered when there is blockage between the target object in the background and the character object outside the background, and improving the rendering accuracy.

The apparatus may determine a moving object based on any two consecutive image frames as a character object, and determine a non-moving object (stationary object) as a target object. For example, after a picture of 2D animation of two consecutive frames is obtained, the position or the shape of an object in the picture changes. For example, if a character moves, that is, an object in one frame differs in position or shape from the next frame, and the object whose position or shape changes is determined as the character object. If neither of the position and the shape of the object in the picture changes, for example, neither of the position and the shape of a building changes, the object whose position and shape remain unchanged is determined as the target object. Although the above example illustrates determining the position and/or shape change using two consecutive frames, it is understood that in some embodiments a single frame or other number of consecutive frames may also be used (e.g., one or more frames). In an embodiment, a target image or picture may refer to as a frame or a frame in a plurality of consecutive frames of 2D animation. Two consecutive frames (or one or more consecutive frames) of 2D animation may refer to as two consecutive target images or pictures (or one or more consecutive target images or pictures) of 2D animation.

In addition, the apparatus may determine a depth value for each pixel in the target picture. The depth value is used for representing the distance of an object presented by a pixel. For example, the target picture 302 is shown in FIG. 3. If a rectangular coordinate system is used according to a display screen of a terminal, each pixel in the target picture 302 corresponds to a pair of coordinates. A depth value of the pixel is obtained according to the ordinate of the coordinate values of the each pixel. Depth values of each row from top to bottom are a, b, . . . , and h respectively. A higher pixel in the vertical direction indicates a larger depth value, and indicates that an object presented by the pixel is further away from the screen. In other words, an object having a larger depth value is depicted as being far away in a direction projecting toward the screen of the display. A smaller depth value indicates that an object presented by a pixel is closer toward a viewer or a user. Depth values of pixels in the horizontal direction are the same or remain constant.

During the rendering, if the depth value of the pixel becomes smaller, the presented picture covers a previous picture. If the depth value of the pixel becomes larger, the presented picture does not change.

In addition, after a depth value of each pixel in the background is determined, and before the first depth value of the pixel of the target object in the background is determined, the depth map may be obtained by using the following method: determining a ground line between the target object in the background and the ground presented in the 2D virtual scene; determining the depth offset of the pixel on the target object according to a projection distance between a pixel on the target object and the ground line; and generating the depth map by using the depth offset.

The depth offset may be, but not limited to, a connection line between the target object and the ground in the background. The depth offset may be a difference between depth values of the pixel on the target object and the pixel projected onto the ground line.

For example, an example in which a pixel 1 and a pixel 2 exist in the target object included in the background is used. The pixel 2 is a pixel on a non-ground line, and the pixel 1 is a pixel projected onto the ground line by the pixel 2. For example, a depth value of the pixel 1 is 100, and a depth value of the pixel 2 is 150. In this case, a projection distance between the pixel 1 and the pixel 2 is 50, and it is determined that a depth offset of the pixel 2 is 50. In this case, a depth map is generated according to a depth offset of each point in the target object.

After the depth map is generated, the apparatus may calculate the first depth value of the target object according to the depth map. For example, as shown in FIG. 4, after the depth value of the pixel is obtained according to the coordinate values of the pixel in the target object in S402, the depth map is obtained in S404. Because the depth map stores the depth offset, the depth offset in the depth map is acquired in S406. Because the depth value and the depth offset of the pixel are obtained, offsetting may be performed on the depth value according to the depth offset through S408, to obtain the first depth value of the pixel in the target object.

Moreover, a second depth value of a pixel on a character object may be obtained by using the following method: obtaining a depth value corresponding to a feature pixel at a target position associated with the character object; and using the depth value corresponding to the feature pixel as the second depth value of each pixel on the character object.

The feature pixel may be, but not limited to, selecting one pixel from among a plurality of pixels covered by the character object as the feature pixel. For example, the lowest pixel of the character object is obtained as the feature pixel, and a depth value of the lowest pixel is assigned to the each pixel in the character object, so that all pixels in the character object have the same depth value. In this case, the depth value of the each pixel is the second depth value.

In addition, during the rendering, the first depth value of the target object and the second depth value of the character object have been obtained. Therefore, during the rendering, rendering may be performed by using the following method: rendering the background, the pixel on the target object in the background being rendered according to the first depth value; and determining pixels occupied by the character object in the background, and obtaining a first pixel (the first pixel being any pixel occupied by the character object in the background) from the pixels occupied by the character object in the background to perform the following operations: rendering the first pixel on the character object according to the second depth value based on determining that the first pixel is not a pixel on the target object; comparing the first depth value and the second depth value on the first pixel based on determining that the first pixel is a pixel on the target object, to obtain a comparison result, the comparison result being used for indicating a blocking relationship between the target object and the character object; and rendering the character object according to the comparison result.

There may be a blocking relationship between the target object and the character object. That is, for example, the character object may be disposed in front of the target object in such a way that the character object blocks a portion of or the entirety of the target object from the user's view. In such a case, during the rendering, the target object may be first rendered, and the character object is then rendered after the rendering of the target object is completed. A non-overlapping part between the character object and the target object may be normally rendered, and an overlapping part between the character object and the target object is determined. If the first depth value is less than the second depth value, it indicates that the target object blocks the character object, so that the rendering of the overlapping part is skipped. If the first depth value is greater than the second depth value, it indicates that the character object blocks the target object, so that the overlapping part is normally rendered according to the method for rendering the character object.

A process of rendering the character object is described with reference to FIG. 5. The coordinates of the position of the character object may be different from a coordinate dimension in the target picture. Therefore, the coordinates of the character object need to be converted into coordinates in the target picture. That is, the coordinates of the character object are converted into coordinates in a 2D rectangular coordinate system used according to a display screen of a terminal. After a renderer is invoked in S502 and the coordinates of the character object are obtained in S504, the coordinates of the character object are converted into the coordinates in the 2D rectangular coordinate system according to the display screen of the terminal in S506. Next, offsetting is performed on the depth value of the character object according to the coordinates of the character object in S508, to obtain the second depth value. Subsequently, the first depth value is compared with the second depth value in S510. When the first depth value is greater than the second depth value, the character object is rendered in S512 to render the overlapping part between the character object and the target object. When the first depth value is less than the second depth value, the rendering of the overlapping part between the character object and the target object is skipped.

According to this embodiment, the method includes: obtaining a target picture for a 2D virtual scene; determining a first depth value corresponding to a pixel on the target object in the background by using a depth offset indicated in a depth map corresponding to the target object; obtaining a second depth value corresponding to a pixel on the character object moving to a target display position; and rendering the target picture according to the first depth value and the second depth value. In the foregoing method, after a background is obtained, it may be determined according to the first depth value of the target object in the background and the second depth value of the pixel on the character object whether to render a pixel overlapping the target object on the character object. Therefore, the character object can be distinct from the target picture in the background, and there is an obvious blocking relationship, thereby ensuring that the background and the character object can still be accurately rendered when there is blockage between the target object in the background and the character object outside the background, and improving the rendering accuracy.

In an embodiment, the rendering unit 908 includes:

(1) a first rendering module configured to render the background, the pixel on the target object in the background being rendered according to the first depth value; and (2) a first determination module configured to determine pixels occupied by the character object in the background, and obtain a first pixel from the pixels occupied by the character object in the background to perform the following operations:

(3) a second rendering module configured to render the first pixel on the character object according to the second depth value based on determining that the first pixel is not a pixel on the target object;

(4) a comparison module configured to compare the first depth value and the second depth value on the first pixel based on determining that the first pixel is a pixel on the target object, to obtain a comparison result, the comparison result being used for indicating a blocking relationship between the target object and the character object; and (5) a third rendering module configured to render the character object according to the comparison result.

For example, description is made with reference to FIG. 6. FIG. 6 illustrates a target picture including a target object 602 and a character object 604. During the rendering, the background is first rendered, and a pixel in the target object 602 in the background is rendered according to the first depth value. Next, the character object 604 is rendered according to the second depth value, and each pixel overlapping the target object 602 in the character object 604 is sequentially used as the first pixel to compare the first depth value with the second depth value. Because the second depth value is the depth value of the pixel of the character object 604, and the first depth value is the depth value of the pixel on the target object 602, after the comparison, a blocking relationship between the character object 604 and the target object 602 may be obtained. FIG. 6 shows a case that the second depth value is less than the first depth value, and it indicates that the pixel in the character object 604 needs to be rendered. In this case, the presented picture is that the pixel of the target object blocks the pixel of the character object.

According to this embodiment, the character object is rendered according to the first depth value and the second depth value, so that the blocking relationship between the character object and the target object may be obtained through clear rendering, thereby improving the accuracy of rendering the target picture.

In an embodiment, the third rendering module includes:

(1) a first rendering submodule configured to render the first pixel according to the second depth value based on the comparison result indicating that the first depth value is greater than the second depth value; and (2) a second rendering submodule configured to skip rendering the first pixel based on the comparison result indicating that the first depth value is less than or equal to the second depth value.

As described above with reference to FIG. 3, a larger ordinate value indicates a larger depth value of the pixel, and an object presented by the corresponding pixel is depicted as being farther away. Therefore, when it is determined that the pixel in the character object is rendered by using the first depth value and the second depth value, the character object is rendered by using the second depth value, and for a pixel in the overlapping part between the character object and the target object, the pixel is used as the first pixel to compare the first depth value and the second depth value of the first pixel. If the first depth value is less than the second depth value, the rendering of the first pixel is skipped, and it indicates that the first pixel on the character object is blocked by the target object. If the first depth value is greater than the second depth value, the first pixel is rendered, and it indicates that the pixel on the character object is not blocked by the target object.

According to this embodiment, it is determined according to the first depth value and the second depth value whether to render the character object, thereby improving the accuracy of rendering the character object, and further improving the rendering accuracy of rendering the target picture.

In an embodiment, the first rendering module includes:

(1) a first obtaining submodule configured to obtain depth information stored in a depth buffer corresponding to the background, the depth information corresponding to the pixel on the target object including the first depth value determined according to the depth offset, the depth information corresponding to a ground pixel used for presenting the ground in the 2D virtual scene including a third depth value corresponding to the ground pixel; and (2) a third rendering submodule configured to render the background according to the depth information.

More detailed description is made with reference to FIG. 3 herein. After the target picture is obtained, the target picture includes the background, and the background includes the target object. If a rectangular coordinate system is used according to the screen of the terminal, each pixel in the target picture corresponds to coordinate values. A depth value is set for the each pixel in the target picture according to the coordinate values. The depth value includes the third depth value used for presenting the ground pixel of the ground and the first depth value that undergoes depth offsetting and is used for presenting the pixel of the target object. The third depth value and the first depth value are used as the depth information to be stored in the depth buffer. During the rendering, the ground rendered by using the third depth value in the target picture may be obtained from the depth buffer, and the target object in the target picture is rendered by using the first depth value.

According to this embodiment, the pixel on the target object is rendered by obtaining the depth information in the depth buffer corresponding to the background, thereby ensuring the accuracy of rendering the target object, and further ensuring the rendering accuracy of rendering the target picture.

In an embodiment, the first rendering module further includes:

a second obtaining submodule configured to: before the background is rendered according to the depth information stored in the depth buffer, obtain display coordinates of each pixel in the background on a screen, and sequentially perform the following steps on a second pixel in the background: determining, according to the display coordinates, a depth change value of the second pixel in a depth indication direction configured for the screen, and determining the depth change value as an initial depth value of the second pixel; storing the initial depth value as the third depth value in the depth buffer based on the second pixel being the ground pixel; and updating the initial depth value to the first depth value and storing the first depth value in the depth buffer based on the second pixel being a pixel on the target object.

The depth change value may be, but not limited to, an ordinate value of the pixel. The ground pixel may be, but not limited to, a pixel of a picture used for showing the ground.

For example, after display coordinates of each pixel in the background is obtained according to the rectangular coordinate system erected according to the display screen of the terminal, an initial depth value of the pixel is determined according to the ordinate of the display coordinates. In this case, the each pixel in the background includes an initial depth value. The initial depth value is stored in the depth buffer as the third depth value when the pixel is used for displaying the picture of the ground. The initial depth value of the pixel is updated to the first depth value, and the first depth value is stored in the depth buffer when the pixel is a pixel in the target object.

According to this embodiment, the initial depth value or the first depth value of the pixel is determined according to the position of the pixel, to obtain the depth buffer, thereby improving the accuracy of obtaining the depth buffer, and further improving the rendering accuracy of rendering the target picture.

In an embodiment, the obtaining unit 906 includes:

(1) an obtaining module configured to obtain a depth value corresponding to a feature pixel at a target position associated with the character object; and (2) a second determination module configured to use the depth value corresponding to the feature pixel as the second depth value of each pixel on the character object.

In addition, the obtaining of a depth value corresponding to a feature pixel at a target position associated with the character object may include, but not limited to, obtaining a depth value of a pixel with the smallest ordinate of the character object. For example, description is made with reference to FIG. 7. FIG. 7 shows a character object 702 in the target picture. The lowest point 704-1 of the right foot and the lowest point 704-2 of the left foot of the character object are points with the smallest ordinate of the character object 702. Because the ordinates of the two points are equal, a depth value of the lowest point 704-1 of the right foot or a depth value of the lowest point 704-2 of the left foot are the same, and a depth value corresponding to both the right foot and the left foot is used as the second depth value of the each pixel on the character object.

According to this embodiment, the depth value of the feature pixel is used as the second depth value of the each pixel on the character object, so that it may be accurately determined according to the second depth value whether to render the pixel of the character object, thereby improving the rendering efficiency of rendering the target picture.

In an embodiment, the apparatus further includes:

(1) a third determination module configured to determine a ground line between the target object in the background and the ground presented in the 2D virtual scene before a first depth value corresponding to a pixel on the target object in the background is determined by using a depth offset indicated in a depth map corresponding to the target object;

(2) a fourth determination module configured to determine the depth offset of the pixel on the target object according to a projection distance between a pixel on the target object and the ground line; and (3) a generation module configured to generate the depth map by using the depth offset.

Here, the depth offset may be, but not limited to, a value greater than or equal to zero.

The ground line may be, but not limited to, a connection line between the target object and the ground. For example, description is made with reference to FIG. 8. FIG. 8 shows a target object 802, and connection lines 804-1 and 804-2 between the target object 802 and the ground. A pixel 806 on the target object is vertically projected from the position of a pixel 808 on the ground line. In this case, a projection distance between the pixel 806 and the pixel 808 is the depth offset. The depth offset of the each pixel in the target object is obtained, to generate the depth map.

According to this embodiment, the depth offset is determined according to the projection distance between the pixel of the target object in the background and the ground line, thereby improving the efficiency and accuracy of generating the depth map, further ensuring the accuracy of obtaining the first depth value, and improving the accuracy of rendering the target picture.

Figure 10:
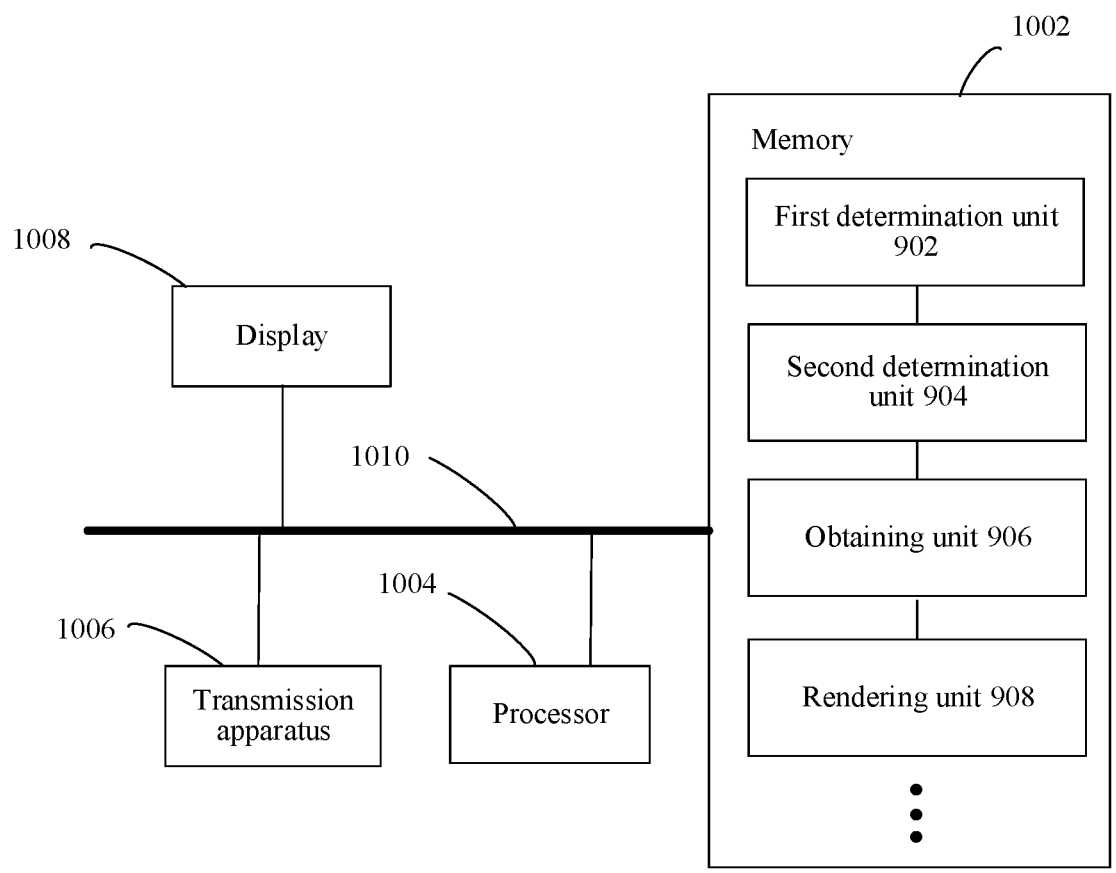
FIG. 10 is a structural diagram of an electronic apparatus according to an embodiment.

According to another aspect of the embodiments, an electronic apparatus for implementing the foregoing picture rendering method is further provided. FIG. 10 is a schematic structural diagram of an electronic apparatus according to an embodiment. As shown in FIG. 10, the electronic apparatus includes a memory 1002 and a processor 1004. The memory 1002 stores a computer program, and the processor 1004 is configured to perform the steps in any one of the foregoing method embodiments by accessing the computer program stored in the memory 1002.

In this embodiment, the electronic apparatus may be located in at least one of a plurality of network devices in a computer network.

In addition, the processor may be configured to perform the following steps by using the computer program:

S1. Obtain a target picture or image for a 2D virtual scene, the target picture including a background and a character object moving in the background, the background including a target object located at a fixed position.

S2. Determine a first depth value corresponding to a pixel on the target object in the background by using a depth offset indicated in a depth map corresponding to the target object, the depth map recording a depth offset of each pixel on the target object.

S3. Obtain a second depth value corresponding to a pixel on the character object moving to a target display position.

S4. Render the target picture according to the first depth value and the second depth value.

A person of ordinary skill in the art may understand that, the structure shown in FIG. 10 is only an example, but may include more or less components than that illustrated in FIG. 10. The electronic apparatus may be a terminal device such as a smartphone (such as an Android mobile phone or an iOS mobile phone), a tablet computer, a palmtop computer, a mobile Internet device (MID), or a PAD. FIG. 10 does not constitute a limitation on the structure of the electronic apparatus. For example, the electronic apparatus may further include more or fewer components (such as a network interface) than those shown in FIG. 10, or have a configuration different from that shown in FIG. 10.

The term used in the embodiments of the disclosure such as "unit" or "module" indicates a unit for processing at least one function or operation, and may be implemented in hardware, software, or in a combination of hardware and software.

The term "unit" or "module" may be implemented by a program that is stored in an addressable storage medium and executable by a processor.

For example, the term "unit" or "module" may include software components, object-oriented software components, class components and task components, processes, functions, attributes, procedures, subroutines, segments of a program code, drivers, firmware, microcode, circuitry, data, databases, data structures, tables, arrays, and/or variables.

The memory 1002 may be configured to store software program, code and module, for example, a program instruction/module corresponding to the picture rendering method and apparatus according to the one or more embodiments. The processor 1004 may be configured to perform various functional applications and data processing by running a software program and/or a module stored in the memory 1002, and may be configured to implement the foregoing picture rendering method. The memory 1002 may include a high-speed random memory, and may be a non-volatile memory such as one or more magnetic storage apparatuses, a flash memory, or another non-volatile solid-state memory. In some embodiments, the memory 1002 may further include memories remotely disposed relative to the processor 1004, and the remote memories may be connected to a terminal through a network. An example of the network includes, but is not limited to, the Internet, an intranet, a local area network, a mobile communication network, and a combination thereof. The memory 1002 may specifically store, but not limited to, the target picture, the depth map, the depth information, and the like. In an example, as shown in FIG. 10, the memory 1002 may include, but not limited to, the first determination unit 902, the second determination unit 904, and the obtaining unit 906, and the rendering unit 908 in the picture rendering apparatus. In addition, the memory may further include, but not limited to, other modules and units in the foregoing picture rendering apparatus.

Furthermore, a transmission apparatus 1006 is configured to receive or transmit data through a network. Specific examples of the network may include a wired network and a wireless network. In an example, the transmission apparatus 1006 includes a network interface controller (NIC), which may be connected to another network device and/or router by using a network cable, to communicate with the Internet or a local area network. In an example, the transmission apparatus 1006 is a radio frequency (RF) module, which communicates with the Internet in a wireless manner.

In addition, the electronic apparatus further includes a display 1008 configured to display a rendering result and a connection bus 1010 configured to connect various components in the electronic apparatus.

According to another aspect of the embodiments, a storage medium is further provided. The storage medium may store a computer program, the computer program being configured to, when executed by the processor 1004, perform steps in any one of the foregoing method embodiments.

The storage medium may be configured to store a computer program for performing the following steps:

S1. Obtain a target picture or image for a 2D virtual scene, the target picture including a background (or background image) and a character object moving in the background, the background including a target object located at a fixed position.

S2. Determine a first depth value corresponding to a pixel on the target object in the background by using a depth offset indicated in a depth map corresponding to the target object, the depth map recording a depth offset of each pixel on the target object.

S3. Obtain a second depth value corresponding to a pixel on the character object moving to a target display position.

S4. Render the target picture according to the first depth value and the second depth value.

In an embodiment, the storage medium may be configured to store a computer program for performing the following steps:

S1. Render the background, the pixel on the target object in the background being rendered according to the first depth value.

S2. Determine pixels occupied by the character object in the background, and obtain a first pixel from the pixels occupied by the character object in the background to perform the following operations:

S3. Render the first pixel on the character object according to the second depth value based on determining that the first pixel is not a pixel on the target object.

S4. Compare the first depth value and the second depth value on the first pixel based on determining that the first pixel is a pixel on the target object, to obtain a comparison result, the comparison result being used for indicating a blocking relationship between the target object and the character object.

S5. Render the character object according to the comparison result.

In addition, in an embodiment, the storage medium may be configured to store a computer program for performing the following steps:

S1. Render the first pixel according to the second depth value based on the comparison result indicating that the first depth value is greater than the second depth value.

S2. Skip rendering the first pixel based on the comparison result indicating that the first depth value is less than or equal to the second depth value.

Furthermore, in an embodiment, the storage medium may be configured to store a computer program for performing the following steps:

S1. Obtain depth information stored in a depth buffer corresponding to the background, the depth information corresponding to the pixel on the target object including the first depth value determined according to the depth offset, the depth information corresponding to a ground pixel used for presenting the ground in the 2D virtual scene including a third depth value corresponding to the ground pixel.

S2. Render the background according to the depth information.

In an embodiment, the storage medium may be configured to store a computer program for performing the following steps:

S1. Obtain display coordinates of each pixel in the background on a screen, and sequentially perform the following steps on a second pixel in the background.

S2. Determine, according to the display coordinates, a depth change value of the second pixel in a depth indication direction configured for the screen of a terminal, and determine the depth change value as an initial depth value of the second pixel.

S3. Store the initial depth value as the third depth value in the depth buffer based on the second pixel being the ground pixel.

S4. Update the initial depth value to the first depth value and store the first depth value in the depth buffer based on the second pixel being a pixel on the target object.

In an embodiment, the storage medium may be configured to store a computer program used for performing the following steps:

S1. Obtain a depth value corresponding to a feature pixel at a target position associated with the character object.

S2. Use the depth value corresponding to the feature pixel as the second depth value of each pixel on the character object.

In an embodiment, the storage medium may be configured to store a computer program for performing the following steps:

S1. Determine a ground line between the target object in the background and the ground presented in the 2D virtual scene.

S2. Determine the depth offset of the pixel on the target object according to a projection distance between a pixel on the target object and the ground line.

S3. Generate the depth map by using the depth offset.

A person of ordinary skill in the art may understand that all or some of the steps of the methods in the foregoing embodiments may be implemented by a program instructing relevant hardware of the terminal device. The program may be stored in a non-transitory computer-readable storage medium. The storage medium may include a flash disk, a read-only memory (ROM), a random access memory (RAM), a magnetic disk, an optical disc, and the like.

According to one or more embodiments, a computer program product may include instructions, the instructions, when executed by a processor, causes a computer to perform the foregoing picture rendering method.

The sequence numbers of the foregoing embodiments are merely used for description purposes, and are not intended to indicate priorities and/or preferential order of the embodiments.

An integrated unit may be implemented in the form of a software function unit and sold or used as an independent product. The integrated unit can be stored in the foregoing computer-readable storage medium. Based on such an understanding, the technical solutions of the disclosure, or the part contributing to the existing technology, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the one or more embodiments.

In the one or more embodiments of the disclosure, the descriptions of the embodiments have their respective inventive concepts. For a part that is not described in detail in an embodiment, reference may be made to related descriptions in other embodiments.

It is to be understood that the method and apparatus described above may be implemented in other manners. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the displayed or discussed mutual couplings or direct couplings or communication connections may be implemented through some interfaces. The indirect couplings or communication connections between the units or modules may be implemented in electronic or another form.

The units described as separate parts may or may not be physically separated, and parts displayed as units may or may not be physical units. The units may be located in one position, or may be distributed on a plurality of network units. Some or all of the units may be selected according to actual requirements to achieve the objectives of the technical solutions of the embodiments.

In addition, functional units in the embodiments may be integrated into one processing unit, or each of the units may be physically separated, or two or more units may be integrated into one unit. The foregoing integrated unit may be implemented in the form of hardware, or may be implemented in the form of a software function unit.

The foregoing descriptions are merely exemplary embodiments of the disclosure. A person of ordinary skill in the art may make improvements, substitutions and modifications without departing from the spirit and scope of the disclosure, and the improvements, substitutions and modifications shall fall within the protection scope of the disclosure.

What is claimed is:

1. A picture rendering method, performed by an image processing device, the method comprising:
   obtaining one or more target images for a two-dimensional (2D) virtual scene, each of the one or more target images comprising a background, a character object moving in the background, and a target object located at a fixed position in the background;
   determining a first depth value of a first pixel among a plurality of first pixels on the target object in the background by using a depth offset indicated in a depth map corresponding to the target object, the depth map recording a depth offset of each first pixel of the plurality of first pixels on the target object;
   obtaining a second depth value of a second pixel among a plurality of second pixels on the character object moving to a target display position, wherein the second pixel is a pixel at a particular position of the character object, wherein a depth value of at least one second pixel is different than the second depth value, and wherein each of the plurality of second pixels is assigned a depth value based on the second depth value; and
   rendering the one or more target images according to the first depth value and the second depth value.

2. The method according to claim 1, wherein the rendering the one or more target images according to the first depth value and the second depth value comprises:
   rendering the first pixel on the target object in the background according to the first depth value; and
   determining the at least one second pixel occupied by the character object in the background, and obtaining the at least one second pixel occupied by the character object in the background;
   rendering the at least one second pixel according to the second depth value based on determining that the at least one second pixel is not a pixel on the target object;

comparing the first depth value and the second depth value on the at least one second pixel based on determining that the at least one second pixel is a pixel on the target object, to obtain a comparison result, the comparison result indicating a blocking relationship between the target object and the character object; and rendering the at least one second pixel according to the comparison result.

3. The method according to claim 2, wherein the rendering the at least one second pixel according to the comparison result comprises:

rendering the at least one second pixel according to the second depth value based on the comparison result indicating that the first depth value is greater than the second depth value; and skipping the rendering the at least one second pixel based on the comparison result indicating that the first depth value is less than or equal to the second depth value.

4. The method according to claim 2, wherein the rendering the background comprises:

obtaining depth information stored in a depth buffer corresponding to the background, the depth information corresponding to the first pixel on the target object comprising the first depth value determined according to the depth offset, the depth information corresponding to a ground pixel used for presenting a ground in the 2D virtual scene comprising a third depth value of the ground pixel; and rendering the background according to the depth information.

5. The method according to claim 4, wherein the method further comprises:

obtaining display coordinates of the each first pixel in the background on a screen;

determining, according to the display coordinates, a depth change value of a second first pixel among the plurality of first pixels in a depth indication direction configured for the screen, and determining the depth change value as an initial depth value of the second first pixel;

storing the initial depth value as the third depth value in the depth buffer based on the second first pixel being the ground pixel; and updating the initial depth value to the first depth value and storing the first depth value in the depth buffer based on the second first pixel being a pixel on the target object.

6. The method according to claim 1, wherein the obtaining the second depth value corresponding to the second pixel on the character object moving to the target display position comprises:

obtaining a depth value corresponding to a feature pixel at a target position associated with the character object; and using the depth value corresponding to the feature pixel as the second depth value of the at least one second pixel on the character object.

7. The method according to claim 1, wherein the method further comprises:

determining a ground line between the target object in the background and a ground presented in the 2D virtual scene;

determining the depth offset of the pixel on the target object according to a projection distance between the first pixel on the target object and the ground line; and generating the depth map by using the depth offset.

8. A picture rendering apparatus, comprising:

at least one memory configured to store computer program code; and at least one processor configured to access the memory and operate as instructed by the computer program code, the computer program code comprising:

first determination code configured to cause the at least one processor to obtain one or more target images for a 2D virtual scene, each of the one or more target images comprising a background, a character object moving in the background, and a target object located at a fixed position in the background;

second determination code configured to cause the at least one processor to determine a first depth value of a first pixel among a plurality of first pixels on the target object in the background by using a depth offset indicated in a depth map corresponding to the target object, the depth map recording a depth offset of each first pixel of the plurality of first pixels on the target object;

obtaining code configured to cause the at least one processor to obtain a second depth value of a second pixel among a plurality second pixels on the character object moving to a target display position, wherein the second pixel is a pixel at a particular position of the character object, wherein a depth value of at least one pixel of the plurality of second pixels is different than the second depth value, and wherein each of the plurality of second pixels is assigned a depth value based on the second depth value; and rendering code configured to cause the at least one processor to render the one or more target images according to the first depth value and the second depth value.

9. The apparatus according to claim 8, wherein the rendering code further comprises:

first rendering code configured to cause the at least one processor to render the first pixel on the target object in the background according to the first depth value; and first determination code configured to cause the at least one processor to determine the at least one second pixel occupied by the character object in the background, and obtain the at least one second pixel occupied by the character object in the background;

second rendering code configured to cause the at least one processor to render the at least one second pixel on the character object according to the second depth value based on determining that the at least one second pixel is not a pixel on the target object;

comparison code configured to cause the at least one processor to compare the first depth value and the second depth value on the at least one second pixel based on determining that the at least one second pixel is a pixel on the target object, to obtain a comparison result, the comparison result indicating a blocking relationship between the target object and the character object; and third rendering code configured to cause the at least one processor to render the at least one second pixel according to the comparison result.

10. The apparatus according to claim 9, wherein the third rendering code further comprises:

first rendering sub-code configured to cause the at least one processor to render the at least one second pixel according to the second depth value based on the comparison result indicating that the first depth value is greater than the second depth value; and second rendering sub-code configured to cause the at least one processor to skip the rendering of the at least one second pixel based on the comparison result indicating that the first depth value is less than or equal to the second depth value.

11. The apparatus according to claim 9, wherein the first rendering code further comprises:
   first obtaining sub-code configured to cause the at least one processor to obtain depth information stored in a depth buffer corresponding to the background, the depth information corresponding to the first pixel on the target object comprising the first depth value determined according to the depth offset, the depth information corresponding to a ground pixel used for presenting a ground in the 2D virtual scene comprising a third depth value of the ground pixel; and
   third rendering sub-code configured to cause the at least one processor to render the background according to the depth information.

12. The apparatus according to claim 11, wherein the first rendering code further comprises:
   second obtaining sub-code configured to cause the at least one processor to:
      obtain display coordinates of the each first pixel in the background on a screen;
      determine, according to the display coordinates, a depth change value of a second first pixel among the plurality of first pixels in a depth indication direction configured for the screen, and determining the depth change value as an initial depth value of the second first pixel;
      store the initial depth value as the third depth value in the depth buffer based on the second first pixel being the ground pixel; and
      update the initial depth value to the first depth value and storing the first depth value in the depth buffer based on the second first pixel being a pixel on the target object.

13. The apparatus according to claim 8, wherein the obtaining code is further configured to cause the at least one processor to obtain a depth value corresponding to a feature pixel at a target position associated with the character object, and
   wherein the obtaining code further comprises:
      second determination code configured to cause the at least one processor to use the depth value corresponding to the feature pixel as the second depth value of the at least one second pixel on the character object.

14. The apparatus according to claim 8, further comprising:
   third determination code configured to cause the at least one processor to determine a ground line between the target object in the background and a ground presented in the 2D virtual scene;
   fourth determination code configured to cause the at least one processor to determine the depth offset of the pixel on the target object according to a projection distance between the first pixel on the target object and the ground line; and
   generation code configured to cause the at least one processor to generate the depth map by using the depth offset.

15. A non-transitory computer-readable storage medium, storing at least one computer program code, the at least one computer program code, when executed by a processor, causes the processor to:
   obtain one or more target images for a two-dimensional (2D) virtual scene, each of the one or more target images comprising a background, a character object moving in the background, and a target object located at a fixed position in the background;
   determine a first depth value of a first pixel among a plurality of first pixels on the target object in the background by using a depth offset indicated in a depth map corresponding to the target object, the depth map recording a depth offset of each first pixel of the plurality of first pixels on the target object;
   obtain a second depth value of a second pixel among a plurality of second pixels on the character object moving to a target display position, wherein the second pixel is a pixel at a particular position of the character object, wherein a depth value of at least one second pixel is different than the second depth value, and wherein each of the plurality of second pixels is assigned a depth value based on the second depth value; and
   render the one or more target images according to the first depth value and the second depth value.

16. The non-transitory computer-readable storage medium according to claim 15, wherein the at least one computer program code is executed by the processor to:
   render the first pixel on the target object in the background according to the first depth value; and
   determine the at least one second pixel occupied by the character object in the background, and obtain the at least one second pixel occupied by the character object in the background;
   render the at least one second pixel according to the second depth value based on determining that the at least one second pixel is not a pixel on the target object;
   compare the first depth value and the second depth value on the at least one second pixel based on determining that the at least one second pixel is a pixel on the target object, to obtain a comparison result, the comparison result indicating a blocking relationship between the target object and the character object; and
   render the at least one second pixel according to the comparison result.

17. The non-transitory computer-readable storage medium according to claim 16, wherein the at least one computer program code is executed by the processor to:
   render the at least one second pixel according to the second depth value based on the comparison result indicating that the first depth value is greater than the second depth value; and
   skip the rendering the at least one second pixel based on the comparison result indicating that the first depth value is less than or equal to the second depth value.

18. The non-transitory computer-readable storage medium according to claim 16, wherein the at least one computer program code is executed by the processor to:
   obtain depth information stored in a depth buffer corresponding to the background, the depth information corresponding to the first pixel on the target object comprising the first depth value determined according to the depth offset, the depth information corresponding to a ground pixel used for presenting a ground in the 2D virtual scene comprising a third depth value of the ground pixel; and
   render the background according to the depth information.

19. The non-transitory computer-readable storage medium according to claim 18, wherein the at least one computer program code is executed by the processor to:
   obtain a depth value corresponding to a feature pixel at a target position associated with the character object; and use the depth value corresponding to the feature pixel as the second depth value of the at least one second pixel on the character object.

20. The non-transitory computer-readable storage medium according to claim 15, wherein the at least one computer program code is executed by the processor to:
determine a ground line between the target object in the background and a ground presented in the 2D virtual scene;
determine the depth offset of the pixel on the target object according to a projection distance between the first pixel on the target object and the ground line; and
generate the depth map by using the depth offset.

* * * * *